(12) United States Patent
Kerschbaumer et al.

(10) Patent No.: US 10,655,521 B2
(45) Date of Patent: May 19, 2020

(54) SCR TANK WITH VENTILATION LINE ATTACHED IN SECTIONS

(71) Applicant: Röchling Automotive SE & Co. KG, Mannheim (DE)

(72) Inventors: Dieter Kerschbaumer, Tramin (IT); Veit Gufler, Moos i.P. (IT)

(73) Assignee: RÖCHLING AUTOMOTIVE SE & CO. KG, Manneheim (DE)

( * ) Notice: Subject to any disclaimer, the term of this patent is extended or adjusted under 35 U.S.C. 154(b) by 499 days.

(21) Appl. No.: 15/402,397

(22) Filed: Jan. 10, 2017

(65) Prior Publication Data

US 2017/0234190 A1    Aug. 17, 2017

(30) Foreign Application Priority Data

Feb. 16, 2016   (DE) .................. 10 2016 202 310

(51) Int. Cl.
*F01N 3/20* (2006.01)

(52) U.S. Cl.
CPC ........ *F01N 3/2066* (2013.01); *F01N 2450/22* (2013.01); *F01N 2610/02* (2013.01); *F01N 2610/1406* (2013.01); *F01N 2610/1413* (2013.01); *F01N 2610/1466* (2013.01); *Y02A 50/2325* (2018.01); *Y02T 10/24* (2013.01)

(58) Field of Classification Search
CPC ............ F01N 2450/22; F01N 2610/02; F01N 2610/1406; F01N 2610/1413; F01N 2610/1466; F01N 3/2066; Y02A 50/2325; Y02T 10/24

See application file for complete search history.

(56) References Cited

U.S. PATENT DOCUMENTS

| | | | | |
|---|---|---|---|---|
| 2015/0314676 A1* | 11/2015 | Sportelli | .............. | B60K 15/035 206/524.3 |
| 2016/0009171 A1* | 1/2016 | Sportelli | ................ | B60K 15/03 220/592 |

OTHER PUBLICATIONS

Search Report issued for German Patent Application No. 10 2016 202 310.1 dated Oct. 21, 2016, with machine English translation (13 pages).

* cited by examiner

*Primary Examiner* — Phutthiwat Wongwian
*Assistant Examiner* — Diem T Tran
(74) *Attorney, Agent, or Firm* — Prince Lobel Tye LLP

(57) ABSTRACT

SCR tank (10) for motor vehicles for storing and dispensing aqueous urea solution, comprising a tank shell (16) enclosing a tank volume (18) having fluid delivery opening (20) and a fluid removal opening (in 28), wherein the SCR tank (10) further has a ventilation line (30), through which a gas exchange is made possible between a gas-filled region of the tank volume (18) during operation of the tank and the outer atmosphere of the SCR tank (10), wherein the tank shell (16) toward this end has a gas opening (38), at which the ventilation line (30) terminates or which is penetrated by the ventilation line (30), which is characterized in that in a joint section (52) a ventilation line component (32) contributing to formation of the ventilation line (30) is joined in a materially-bonded manner to a joint surface section (36) of the tank shell (16).

12 Claims, 3 Drawing Sheets

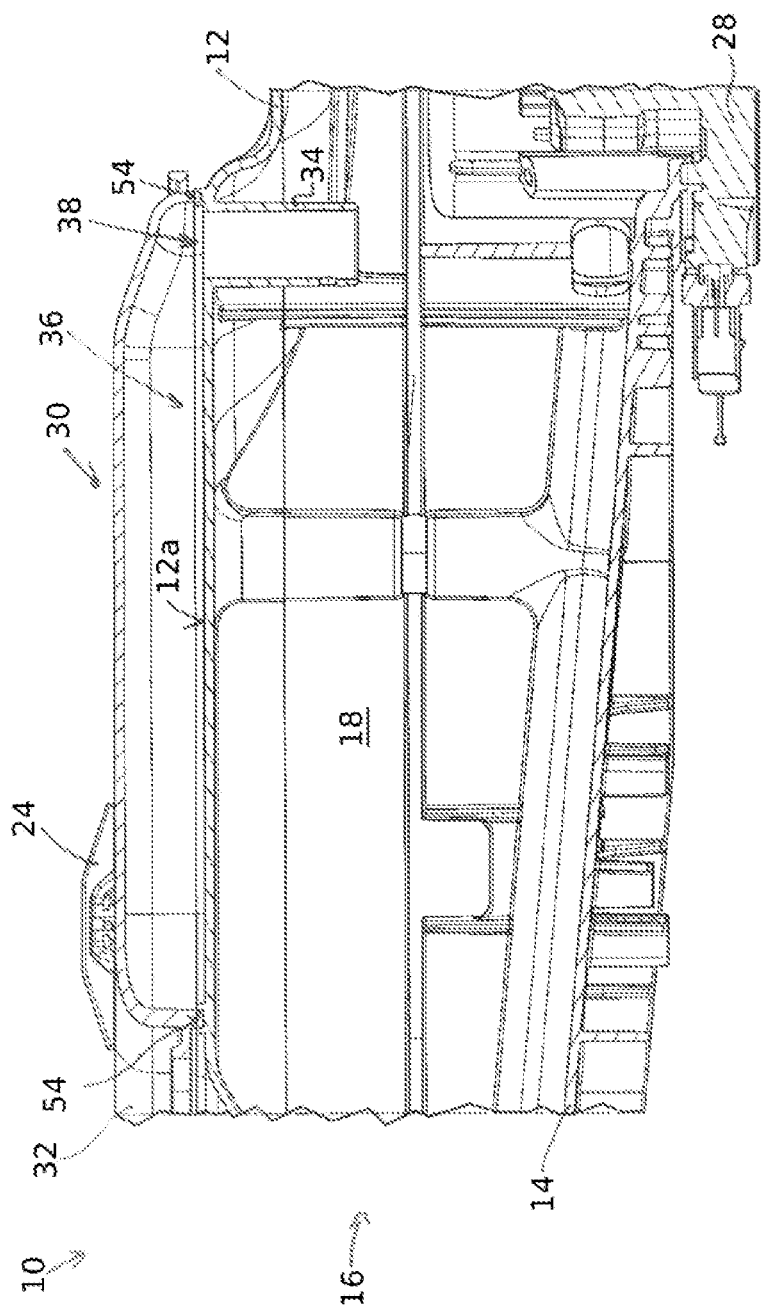

SCR TANK WITH VENTILATION LINE ATTACHED IN SECTIONS

CROSS REFERENCE TO RELATED APPLICATION(S)

Figure 1:
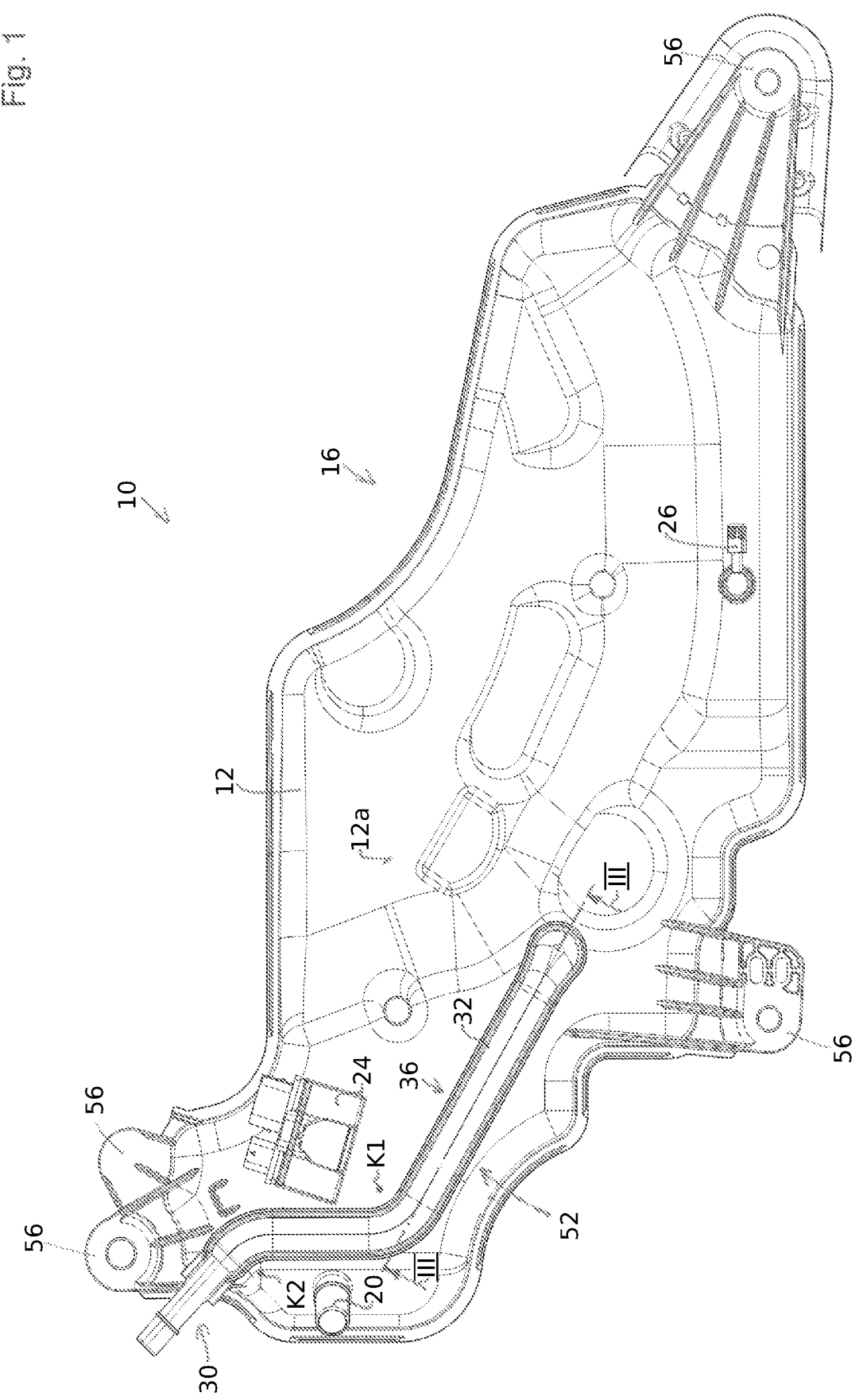

This application claims priority to German Application No. 10 2016 202 310.1, filed Feb. 16, 2016. The entirety of the disclosure of the above-referenced application is incorporated herein by reference.

BACKGROUND OF THE INVENTION

Field of the Invention

The present invention relates to an SCR tank for motor vehicles for storing and dispensing of aqueous urea solution, comprising a tank shell surrounding a tank volume, which tank shell includes a fluid feed opening and a fluid removal opening, wherein the SCR tank further includes a ventilation line, by which a gas exchange is made possible between a region of the tank volume filled with gas during operation of the tank and the outer atmosphere of the SCR tank, wherein the tank shell has a gas opening for this purpose, where the ventilation line terminates or which is penetrated by the ventilation line.

Such tanks on or in motor vehicles for storage and dispensing of aqueous urea solution are generally known in the prior art. The aqueous urea solution usually serves to reduce nitrogen oxides in exhaust gas from internal combustion machinery and thus to decrease pollutant emissions during operation of internal combustion machinery. Aqueous urea solution for vehicles is known for example under the trade name "AdBlue®."

To facilitate filling of the SCR tank with aqueous urea solution and removal of urea solution from same, an SCR tank usually has a ventilation line, through which during filling of the urea solution in the tank, gas expelled from the tank can escape into the outside atmosphere, and through which during removal of the urea solution from the tank, gas from the outer atmosphere can flow into the tank in order to prevent the formation of a negative pressure that impedes removal of urea solution from the tank in the gas-filled region of the tank volume.

SUMMARY OF THE INVENTION

The object of the present invention is to further improve the SCR tanks of the above-described type known from the prior art.

This object is inventively achieved by an SCR tank of the above-mentioned type, wherein in a joint section, a ventilation line component contributing to formation of the ventilation line is joined in a materially-bonded manner to a joint surface section of the tank shell.

Thus a compact SCR tank can be provided wherein, upon installation of the SCR tank in a motor vehicle along with the tank shell, at least one section of the ventilation line is displaced and thus a section of the ventilation line does not specifically have to be displaced through the surroundings of the SCR tank, which possibly is built up with other devices and assemblies. Due to the materially-bonded joining of the ventilation line component to the tank shell, the installation space taken up by the inventive SCR tank differs only slightly to negligibly from that taken up by a tank shell of a conventional SCR tank, wherein the ventilation line is specifically to be displaced. Preferably the additional installation volume taken up by the ventilation line component joined to the tank shell is no more than 2 or 3% of that taken up by the tank shell alone, i.e., without the installation volume taken up by the ventilation line component joined thereto.

In comparison with conventional tanks with ventilation lines running freely in the tank interior, tank volume can even be gained by the proposed compact design.

"Joint surface section" here indicates that part of the surface of the tank shell to which the ventilation line component is joined.

"Materially-bonded" in the meaning of the present application indicates any type of material mixture between the ventilation line component and the tank shell, i.e., in particular a weld connection. Diffusion-based joints as well as adhesion of the ventilation line component and the tank shell also lead to materially-bonded connections in the meaning of the present application.

The basic idea is that a ventilation line component that fully limits the ventilation line radially outward along its extension path section disposed in the extension region of the ventilation line component, and therefore on its own completely defines a ventilation line section, is to be joined in a materially-bonded manner to the joint surface section of the tank shell. However, a ventilation line protruding less markedly from the joint surface section of the tank shell with the same flow cross-section can be obtained in an advantageous further development of the present invention by a surface of the tank shell in the joint section forming a part of the casing of the ventilation line. Then the ventilation line component can be configured without a wall on its side facing the tank shell in the joined state, so that the dimension by which the ventilation line component in the joined state protrudes from the tank shell can be configured to be shorter by at least the omitted wall.

To reduce the dimension of the ventilation line component in the direction of protrusion from the joint surface section of the tank shell after materially-bonded joining of the ventilation line component and tank shell, it can in particular be provided that the ventilation line component in the joint section has an essentially U-shaped cross-section in a cross-sectional plane orthogonal to its longitudinal extension, wherein the ventilation line component in the joint section with the free arm ends of the U-shaped cross-section is joined to the joint surface section of the tank shell. Thus the initially absent wall section between the free arm ends of the U-shaped cross-section of the ventilation line component for forming a complete ventilation line is provided by the joint surface section of the tank shell, so that the ventilation line component and the tank shell together completely enclose in the joint section the ventilation line in the circumferential direction about their extension path.

The ventilation line extends along the extension path, so that the extension path as a virtual centerline of the ventilation line defines an axial direction of the same, and radial rays emanating orthogonally from the extension path define a radial direction. The circumferential direction is then self-explanatorily a circumferential direction extending at a radial distance from the virtual centerline of the ventilation line orthogonally to the radial rays, thus encircling about the virtual centerline.

To facilitate the disposing of the ventilation line component on the tank shell, more precisely on the joint surface section of same, it is advantageous if a joint surface made of the end surface of the ventilation line component and the joint surface section of the tank shell has a groove, and the other respective joint surface has a projection that is fitable into the groove. It can thus be ensured that the ventilation line component is always disposed in the same place relative to the tank shell in any manufactured tank.

For reasons of manufacturing simplification, it is preferred if the tank shell has the groove and the ventilation line component, which as a rule is much smaller than the tank shell, and has the projection that is fitable into the groove. Here the free end of an arm or of both arms of the above-mentioned U-shaped cross-section can even be the projection, so that in the tank shell a depression can be provided into which the ventilation line component is insertable. The ventilation line component is preferably weldable to the tank shell by ultrasound welding or by friction welding after its positioning on the tank shell, although other welding methods such as hot plate welding or even other attachment methods such as adhesion should not be ruled out.

As already mentioned at the start, the ventilation line can terminate at the gas opening or can run through the gas opening into the tank volume. According to the present application the gas opening of the tank shell should not only be deemed as penetrated when a component encompassing the gas line is physically passed through the gas opening, but also when the ventilation line is designed in multi-part along its extension path, and two line components formed separately from each other and contributing to formation of the ventilation line abut on each other at the gas opening.

Then, when the ventilation line extends through the gas opening into the tank volume of the SCR tank, a section of the ventilation line within the tank volume is advantageously configured as one-piece with the tank shell. Thus a threading of the ventilation line through the gas opening, which threading delays the installation process, can be omitted. In addition, sealing problems of the ventilation line at the gas opening can be avoided. For example, the tank shell can have one of these nozzles at the gas opening, in particular a cylindrical nozzle, which projects inward from the wall of the tank into the tank volume. Due to the weld connection of the ventilation line component to the tank shell, this can also be connected to the tank shell with adequate gas tightness only by the joining process. Further sealing measures can then be omitted.

Furthermore, the ventilation line component can interact with the tank shell in such a way that due to the materially-bonded joining of the ventilation line component to the joint surface section of the tank shell, the stiffness of the tank shell can be increased overall. Toward this end it is advantageous if the ventilation line in the joint section, at least in one section, extends curved about an axis of curvature that is orthogonal to the joint surface section of the tank shell. The stiffness-enhancing effect can be greater the more sections the ventilation line has in the joint section that are curved about an axis of curvature that is orthogonal to the joint surface section of the tank. Here it goes without saying that each curved section of the ventilation line is curved about its own axis of curvature or even group of axes of curvature, wherein each of these axes of curvature is oriented orthogonal to the joint surface section. The orthogonal rotation of the axis of curvature ensures that the ventilation line even in a possibly curved course segment can abut flat against the surface of the tank shell. The axes of curvature are thus also oriented orthogonal to the extension path of the ventilation line in the curved section.

If the ventilation line in the joint section has more than one curved section, preferably successive curved sections along the extension path are respectively curved in opposite directions.

A joint connection that can be produced simply and quickly between the ventilation line component and the joint surface section of the tank shell can be produced if the joint surface section of the tank shell is flat at least in sections. The larger the flat portion of the joint surface section is, the easier the attachment processes for connecting the ventilation line component and the tank shell. Therefore, preferably the entire joint surface section of the tank shell is flat.

In principle it can be considered to dispose the ventilation line component on the inside of the tank shell and join it thereto. Then, however, the gas opening is penetrated by the ventilation line in order to guide the ventilation line from the tank interior into the outer atmosphere. For this reason and also because stiffening formations that disrupt joining, such as ribs or other functional formations, can be disposed on the inside of the tank shell, the ventilation line component is preferably joined to the tank shell on the outside of the tank shell. The outside of the tank shell frequently has a smoother surface than the inside of same.

In principle the tank shell can be formed as one-part, for example by blow molding. Then however the inside of the tank shell as a rule is free of formations, which can impair the overall stiffness of the tank or which also can increase in an undesirable manner the sloshing tendency of the fluid contained in the tank. It is therefore preferable that the tank shell is formed as multi-part and comprises at least one upper shell component and a lower shell component connected thereto. The upper shell component and the lower shell component are preferably produced separately from each other. Since due to its function the ventilation line terminates in the gas-filled region of the tank volume, in order to make possible gas exchange between the tank volume (tank interior) and the outside atmosphere, the ventilation line is preferably disposed on the upper shell component and joined thereto. Therefore the joint surface section is preferably also formed on the upper shell component.

Although the focus presently should not be on the manufacturing method for the formation of tank components, nonetheless an injection molding process for manufacturing individual or all components of the inventive SCR tank described here is preferred. For this reason the upper shell component and/or the lower shell component and/or the ventilation line component is or are injection molding components. In this way the respective component can be manufactured with large degrees of structural design freedom, for example with the smoothest possible outer surface and with stiffening ribs and other functional formations of a structured inner surface.

BRIEF DESCRIPTION OF THE DRAWING FIGURES

The present invention is described below in more detail with reference to the accompanying drawings.

FIG. 1 shows a plan view of an inventive embodiment of an SCR tank of the present application, FIG. 2*a* shows a plan view of a ventilation line component as used on the SCR tank of FIG. 1, FIG. 2*b* shows a cross-sectional view through the ventilation line component of FIG. 2*a* in the section plane IIb-IIb of FIG. 2*a* and FIG. 3 shows a partial sectional view of the SCR tank of FIG. 1 along the section plane III-III of FIG. 1.

DETAILED DESCRIPTION OF THE PREFERRED EMBODIMENTS

FIG. 1 shows an inventive embodiment of an SCR tank of the present application that is generally designated with 10.

The observer of FIG. 1 sees the upper shell component 12 of the SCR tank 10, which together with a lower tank component 14 discernible only in FIG. 3 forms a tank shell 16 of the SCR tank 10, which encloses a tank volume 18 in the interior of the SCR tank 10.

Various functional formations are formed on the upper tank components 12, for example, an inlet nozzle 20 for attaching a filling line thereto in order to introduce fluid, in particular aqueous urea solution, through the filling nozzle 20 into the tank volume 18 of the SCR tank 10. Furthermore, a receptacle 24 for a fill-level sensor can be formed on the upper component 12, with which the fill level of the SCR tank 10 is determinable. Likewise on the upper shell component 12—or also on the lower shell component 14—a terminal 26 can be configured in order to supply a heating device installed in the SCR tank 10 with electric power in order to heat the tank volume 18 of the SCR tank. Under normal atmospheric conditions aqueous urea solution usually freezes at around −11° C., a temperature that is easily reached in the cold season in Europe as well as in other parts of the world. The heating device not explicitly shown can prevent or at least delay undesired freezing of the aqueous solution.

As on the upper shell component 12, functional components can also be mounted or functional formations can be configured on the lower shell component 14. In FIG. 3 part of a pump 28 is shown, with which aqueous urea solution can be taken in a targeted manner from the tank volume 18 in the interior of the SCR tank 10 and delivered to a device for exhaust purification.

When the aqueous urea solution is added to the tank volume 18 of the SCR tank 10, gas that is present in the tank volume 18 must be displaced by the urea solution streaming and likewise when urea solution is removed from the tank volume 18, gas must be able to stream into the tank volume 18 in order to keep a negative pressure acting counter to the pump 28 from forming in the gas-filled region of the tank volume 18.

For this purpose a ventilation line 30 is provided on the SCR tank 10, which ventilation line 30 extends from the outside of the SCR tank 10 into the tank volume 18. On the outside of the SCR tank 10 the ventilation line 30 is formed by a ventilation line component 32. In the interior of the tank 18 the ventilation line 30 is formed by an end nozzle 34, preferably in a single piece with the upper shell component 12 and projecting inward from the wall of the upper shell component 12. The ventilation line component 32 is shown in FIG. 2a without the rest of the SCR tank 10, i.e., essentially without the tank shell 16.

The ventilation line component 32 extends along an extension path E along a substantially even joint surface section 36 to the outside 12a of the upper shell component 12. In the example shown the joint surface section 36 is flat over the entire extension region of the ventilation line component 32. This does not have to be the case, however.

The ventilation line component 32 shown as an example is configured at its longitudinal end 32a, which overlays a gas opening 38 (See FIG. 3) of the tank shell 16, more precisely of the upper shell component 12, with enlarged cross-section, in order to be able to completely cover the gas opening 38. In this way it is possible to provide a gas opening 38 on the SCR tank whose diameter is greater than the small width of the ventilation line component 32.

At its opposite longitudinal end 32b, the ventilation line component 32 is provided with a connection nozzle 40, in order to connect additional line components of the ventilation line 30. The connection nozzle 40 is preferably configured as one-piece with the rest of the ventilation line component 32. The ventilation line component 32 and the terminal nozzle 34 are thus not necessarily the only components that contribute to formation of the ventilation line 30.

Figure 2:
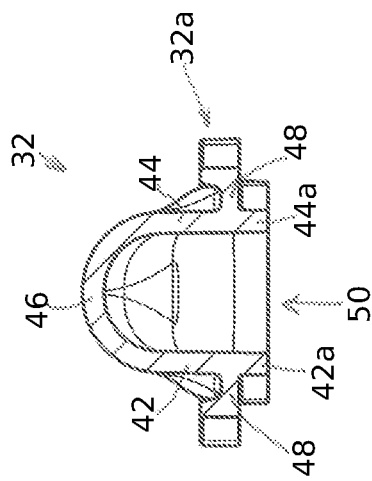
Figure 2:
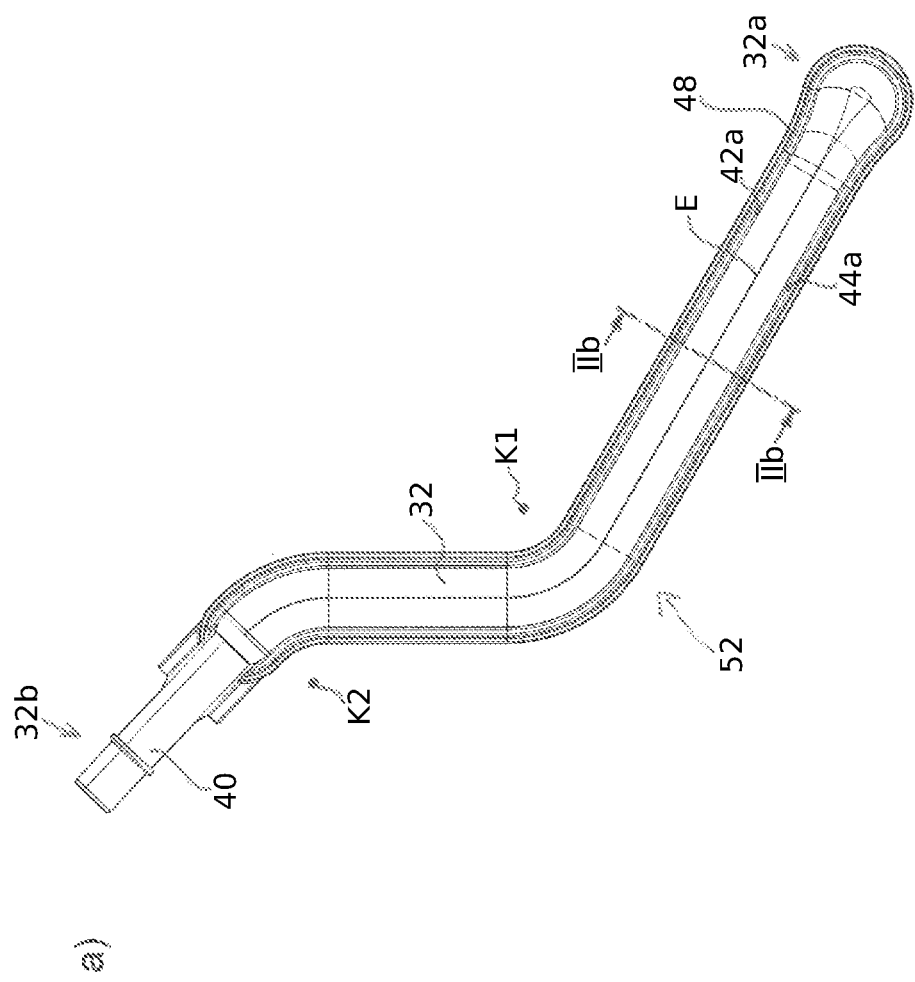

The ventilation line component 32, as can be seen in FIG. 2a, is curved in its course at least once, preferably several times, namely in the depicted example at least two times: a first time about the axis of curvature K1 orthogonal to the flat joint surface section 36, and a second time about the axis of curvature K2, which is likewise orthogonal to the joint surface section 36. The axes of curvature K1 and K2 are orthogonal to the drawing plane of FIG. 2.

A cross-section through the ventilation line component 32 along the section plane IIb-IIb in FIG. 2a is shown in FIG. 2b. The ventilation line component 32 has an essentially U-shaped cross-section which opens downward over its entire length except for the connection nozzle 40, having arms 42 and 44 that preferably extend parallel to each other, and a base 46 that connects the arms 42 and 44. The free longitudinal ends 42a and 44a of the arms 42 and 44, which form a joint end surface of the ventilation line component 32, project via a radial projection 42, which projects radially outward from the arms 42 and 44.

The joint surface and where applicable also the radial projection 48 define a joint section 52, wherein the ventilation line component 32 is joined in a materially-bonded manner to the joint surface section 36 of the upper shell component 12, for example by welding, in particular ultrasound welding.

The radial projection 48 can be a part of the materially-bonded connection between the ventilation line component 32 and the upper shell component 12. But this does not need to be the case. In the present example, the radial projection 48, as may be seen in FIG. 3, is disposed with a spacing from the outer surface 12a of the upper shell component 12. However, for the attachment process the radial projection 48 can abut on the outer surface 12a of the upper shell component 12 and be fused by welding, in particular ultrasound welding, to the material of the upper shell component 12.

In the present example only the free ends 42a and 44a of the arms 42 and 44 of the U-shaped cross-section of the ventilation line component 32 are connected in a materially-bonded manner directly to the joint surface section 36 of the tank shell 16, in particular the upper shell component 12. Toward this end the free ends 42a and 44a of the arms 42 and 44 are fitted in a corresponding groove 54 in the joint surface section 36, in order to ensure a correct position and orientation of the ventilation line component 32 relative to the gas opening 38 and to the upper shell component 12 prior to establishment of the materially-bonded connection between the ventilation line component 32 and the upper shell component 12. After fitting of the free ends 42a and 44a in the groove 54, the ventilation line component 32 is welded to the upper shell component 12.

In fact the free ends 42a and 44a of the arms 42 and 44 in FIG. 2b are part of a single enclosing projection which is formed as a complement to the enclosing groove 54. Because of the cross-sectional depiction of FIG. 2b, however, the description used above was selected for illustration of the U-shaped cross section form of the ventilation line component 32 in the joint section 52.

In the finished attached state, the ventilation line 30 is bounded radially outward—in the joint section 52 on three successive sides in the circumferential direction about the extension path E by the ventilation line component 32 and in the region between the free ends 42a and 44a of the arms 42 and 44 by the joint surface section 36, thus by the outside 12a of the upper shell component 12 of the tank shell 16 of the SCR tank 10. In the region of the connection fitting 40, the ventilation line 30 is bounded radially outward solely by the ventilation line component 32.

Due to the multiply curved course of the ventilation line component 32 with the substantially even end surface 50, in addition the tank shell 16 or at least the upper shell component 12 can be stiffened if the ventilation line component 32 is connected in a materially-bonded manner to the upper shell component 12.

Furthermore, the ventilation line 30 at least in direct proximity to the tank shell 16 can be guided directly along the tank shell 16, without reducing the tank volume 18 and without excessively protruding from the outside 12a of the upper shell component 12. In this way an advantageously compact SCR tank 10 can be obtained that can be simply and safely accommodated even in the already confined installation space of a motor vehicle.

The upper shell component 12—just as the lower shell component 14—can be configured in an integrated manner with fastening formations 56, with which the SCR tank 10 can be mounted on the motor vehicle.

The invention claimed is:

1. A tank for motor vehicles for storing and dispensing aqueous urea solution, comprising:
   a tank shell surrounding a tank volume said tank shell has a fluid delivery opening and a fluid removal opening; and
   a ventilation line, through which a gas exchange is made possible between a region of the tank volume that during operation of the tank is filled with gas, and the outer atmosphere of the tank;
   wherein the tank shell has a gas opening at which the ventilation line terminates or which is penetrated by the ventilation line for the gas exchange;
   wherein in a joint section, a ventilation line component contributing to the formation of the ventilation line is joined in a materially-bonded manner to a joint surface section of the tank shell, such that at least one of a material mixture between the ventilation line component and the tank shell, a diffusion-based joint of the ventilation line component and the tank shell, and an adhesion of the ventilation line component and the tank shell is formed;
   wherein a surface of the tank shell forms a part of the casing of the ventilation line in the joint section;
   wherein the ventilation line component in the joint section has an U-shaped cross-section in a cross-sectional plane orthogonal to its longitudinal extension, wherein the ventilation line component in the joint section is joined by the arm ends of the arms of the U-shaped cross-section to the joint surface section of the tank shell; and
   wherein the ventilation line component and the tank shell together completely enclose in the joint section the ventilation line in the circumferential direction about an extension path of the ventilation line.

2. The tank according to claim 1,
wherein a joint surface out of the joint end surface of the ventilation line component and the joint surface section of the tank shell has a groove and the respective other joint surface has a projection that fits in the groove.

3. The tank according to claim 1,
wherein a section of the ventilation line located in the tank volume is formed as one-piece with the tank shell.

4. The tank according to claim 1,
wherein the ventilation line in the joint section is curved at least once, about an axis of curvature orthogonal to the joint surface section of the tank shell.

5. The tank according to claim 1,
wherein the joint surface section of the tank shell is flat at least in sections.

6. The tank according to claim 1,
wherein the ventilation line component on the outside of the tank shell is joined thereto.

7. The tank according to claim 1,
wherein the tank shell is formed as multi-part and comprises at least one upper shell component and a lower shell component connected thereto, wherein the joint surface section is formed on the upper shell component.

8. The tank according to claim 7,
wherein the upper shell component and/or the lower shell component and/or the ventilation line component is/are made by injection molding.

9. The tank according to claim 1, wherein the ventilation line in the joint section is curved at least twice about an axis curvature orthogonal to the joint surface section of the tank shell.

10. The tank according to claim 4, wherein the ventilation line is curved along its extension path E alternating in opposite directions.

11. The tank according to claim 9, wherein the ventilation line is curved along its extension path E alternating in opposite directions.

12. The tank according to claim 1, wherein the joint surface section of the tank shell is entirely flat.

* * * * *